United States Patent Office 3,170,781
Patented Feb. 23, 1965

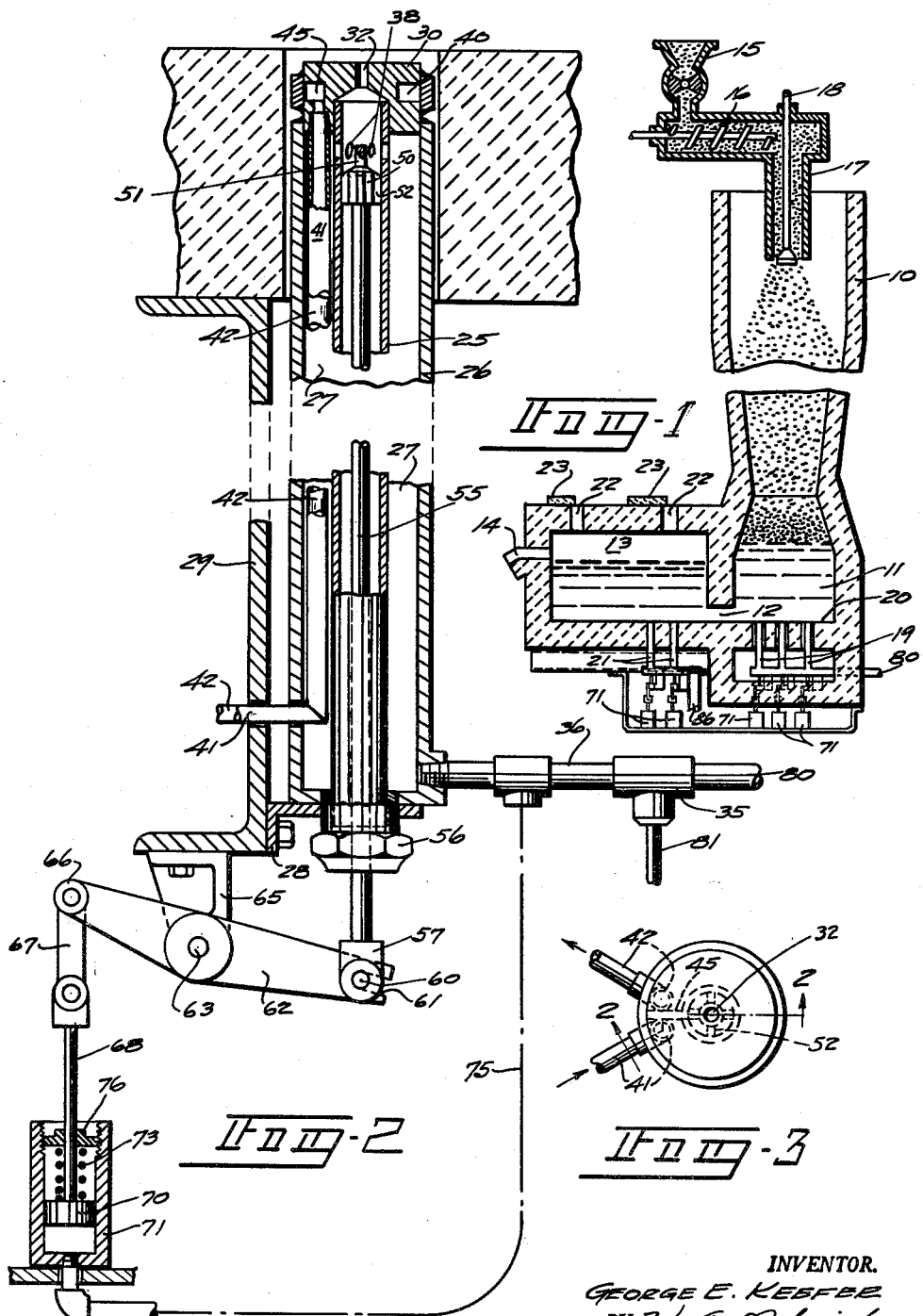

3,170,781
APPARATUS FOR FEEDING GASEOUS MATERIALS TO GLASS MELTING FURNACES
George E. Keefer, Sylvania, Ohio, assignor to Owens-Illinois Glass Company, a corporation of Ohio
Filed Nov. 18, 1959, Ser. No. 853,854
4 Claims. (Cl. 65—159)

This invention relates to devices designed for supplying gaseous materials to a body of molten glass for the purpose of melting same, maintaining same molten or for bubbling the glass to assist in the complete melting thereof. Such devices may be used for supplying and burning a mixture of fuel gas and gases supporting combustion. They may be constructed for supplying the mixed combustible gases at a high pressure and as herein illustrated they are adapted for use in melting and refining glass batch in glass furnaces as well as for bubbling the molten glass. The present application is a continuation-in-part of my earlier application Serial No. 702,290, filed December 12, 1957 (now abandoned).

In the manufacture of glass, it is common practice to introduce the raw batch materials into a large melting tank wherein the glass batch materials are melted by burning gases or flames introduced above the level of the glass in the tank, the flames being spread over the surface of the glass or batch materials and gradually soaking heat into and melting the latter. In such a method the pressure of the burning gases is necessarily compartively low and the flames spread over a large area. Such method requires large tanks, has low thermal efficiency with large heat losses, and correspondingly small output relative to the size or area of the melting surface, and is comparatively inefficient.

The present invention provides a novel form of burner for use with a glass melting furnace, the burners being arranged to introduce the gaseous mixture through the floor of the furnace, directing the burning gases upwardly under high pressure through the mass of the melting batch materials. An object of the invention attained by such a combination is to provide high thermal efficiency, and to rapidly melt and refine the glass while permitting such operations to be carried on in a comparatively small furnace.

It has heretofore been proposed to melt glass batch by the use of burners supplying fuel gases and the gases to support combustion through the floor of the furnace tank and upwardly through the glass material at high pressure, as shown, for example, in the patent to Henry et al., 2,634,555, Processes for Melting Glass and the Like. In the method disclosed in said patent, the fuel gases and the air or combustion supporting gases are introduced separately into the furnace. Such method has been found to be impractical. It does not admit the proper mixing and burning of the gases.

This present invention provides for a proper mixing and burning of the fuel gases and also provides in the event of failure of such gases that the molten glass will be prevented from entering into the burner or the bubbler.

It is also within the purview of this present invention to use the construction found in the burner as a device for supplying a gas or fluid under pressure, through the bottom of the various furnace compartments, and using such fluid or gas as a bubbling medium. Thus the molten glass may be caused to move upwardly to continuously present movement of the glass for better or more complete homogeneity thereof.

An object of the present invention is to provide an improved form of burner in which gases are mixed before entering the furnace.

A further object is to provide a burner or bubbler device which will automatically shut off whenever the pressure of the gaseous mediums falls below a standard or set pressure.

A still further object is to provide such burners and bubblers in a combination wherein a heating and bubbling of the glass is accomplished completely within the body of molten glass.

Other objects of the invention will appear hereinafter.

Referring to the accompanying drawings:

FIG. 1 is a sectional elevation of a glass melting and fining furnace with which my improved form of burner is used;

FIG. 2 is a sectional view on a comparatively large scale which illustrates the structure common to both the burner or bubbler with the section being taken at line 2—2 on FIG. 3, and FIG. 3 is a plan view of the burner.

Referring to FIG. 1, the furnace comprises a melting tank or shaft 10 with downwardly tapered walls and an enlarged melting pot or compartment 11 at the lower end of the shaft 10. The molten glass flows from the compartment 11 through an outlet 12 into a refining tank or compartment 13 from which the glass may be discharged through an outlet opening 14 to any desired form of working device. The raw batch materials are introduced into a hopper 15 and fed by a spiral feeder 16 into a vertical spout 17 through which the material is delivered to the tank 10. The valve 18 may be adjusted to regulate the flow of batch materials into the furnace.

Burners 19 are mounted to extend upwardly through openings in the floor 20 of the tank 11 and these burners may be positioned in rows extending both laterally and horizontally of the tank 11. Burners 21 may be extended through the floor of the refining compartment 13 and may be positioned in rows extending through the width of the tank 13. Stack openings 22 are provided in the roof of the refining compartment 13 and damper blocks 23 are provided to control the flow of combustible or other gases in and from said compartment.

Referring to FIGS. 2 and 3, each of the burners 19 or 21 comprises an inner tube 25 and an outer tube 26 of larger diameter concentric with the tube 25 and providing thereby an annular or tubular space 27. The outer tube 26 is sealed at the bottom and mounted on a bracket 28 which in turn is mounted on a furnace support 29. A nozzle head 30 at the upper end of the tubular members 25 and 26 bridges the space between the inner and outer tubes 25 and 26 to form a closure for the upper end of the annular space 27. The nozzle head 30 is formed with a central restricted outlet opening 32 through which a combustible gas mixture is provided from the mixer 35. The gases, either mixed or otherwise will pass from a source, not shown, through conduit 36 into chamber 27 and thence through ports 38 in tube 25 and through the outlet 32. The head 30 is formed with an annular cooling chamber 40 through which a cooling fluid such as air or water is circulated. The coolant is introduced through a pipe 41 extending upwardly through the space 27 and opening into chamber 40 in the head 30. The coolant after circulating through the chamber 40 is discharged through a vertical pipe 42, a partition 45, being provided in the head 30 between the pipes 41 and 42.

A valve member 50 is provided within the tube member 25 and said valve is provided with a plug portion 51 and guiding wings 52 which insure the alignment as between the plug 51 and outlet opening 32 of the nozzle head 30. The valve 50 it attached to stem 55 which extends through bushing 56 which seals the lower end of tube 25.

Attached to the lower end of stem 55 is a head 57 carrying a pin 60 adapted to ride in a slot 61 of lever 62. Said lever 62 is fulcrumed at 63 in a bracket 65 and has attached to its opposite end 66 a link 67 which in turn connects to a piston rod 68 of piston 70 in cylinder 71.

A spring 73 provides power to hold the valve 50 in the outlet 32 of nozzle 30 and against the pressure head of glass in the tank mainly because of the reduced size of the outlet 32 which under most circumstances will not be in excess of ¼ of an inch in diameter.

A conduit 75 connects the cylinder 71 and conduit 36 to thereby supply pressure beneath the piston 70 to retain valve 50 in the position shown in FIG. 2 and in balanced resistance to spring 73. The cap 76 of cylinder 71 is adjustable to control the applied pressure from spring 73 in accordance with gas pressure being supplied from conduit 75.

Referring to FIGS. 1 and 2, the mixture of fuel gases and combustion supporting gases is introduced through pipes 80 and 81 into the mixer 35 and thence to the burners 19. The mixture of gases is discharged through the nozzle 32 into the tank 11 at pressure sufficient to overcome the pressure head of glass in the tank. Combustion takes place within the body of the glass in the tank, the flames or gases of combustion being projected under high pressure through the body of melting glass batch within the tank. The glass as it is melted flows through opening 12 into the fining compartment 13 where it may be further heat-treated and refined by the combustion of gases supplied through a conduit 86 to the submerged burners 21 which discharge into the compartment 13.

In the event that further heat may not be desirable in tank 13 then the combustion gases may be replaced with air or other non-combustible gases at pressures sufficient to overcome the static pressure head of molten glass and which when released from nozzle 32 will bubble up through the molten glass without combustion occurring and tend to equalize temperatures therein, as well as eliminate bubble pockets or other undesirable characteristics therefrom.

To start the furnace, the usual or well known auxiliary heat up burners are started to heat up the melting and refining chambers 11 and 13 respectively. After these chambers have attained a temperature of 1600° F. the submerged burners 19 and 21 are turned on and the temperature in the chambers is increased to 2400° F. Cullet is then fed into the furnace through a temporary opening to bring the depth of molten glass up to an operating level. During this period the submerged burners 19 and 21 operate to discharge the combustable mixture through the molten glass, or, if desired, any number or all of these burner devices 19 and 21 may be operated strictly as bubblers rather than as per their combined function of burners and bubblers. With the furnace filled with glass to the operating level batch is then fed through the batch feeding hopper 17 into the melting shaft 10.

It is of course contemplated that both bubblers and burners may be used in one or both compartments of the furnace and such combined use will require only the piping of the desired gases to the burners or bubblers to be so operated.

Modifications may be resorted to within the spirit and scope of my invention as defined in the appended claims.

I claim:

1. A device for injecting gaseous materials into a body of molten glass in a glass furnace chamber having side and bottom walls said device comprised of a pair of tubular members in concentric arrangement mounted in an aperture in a wall of said furnace at a place below the surface of said glass body therein and with the outer tube of larger internal diameter than the external diameter of the inner tube, thereby providing an annular chamber between said tubes and extending along the major portion of the length thereof, said chamber being sealed at its opposite ends, a nozzle head at one end of said annular space and arranged to form one of said end seals, said head having a restricted outlet opening extending therethrough that communicates with the furnace chamber and connecting with the inner tube, said head formed with an annular cooling chamber extending circumferentially thereof, means to supply said gaseous materials under operating pressure to said chamber, apertured means in said head connecting said chamber to the inner tube to pass said gases into said inner tube and through said outlet opening into the furnace chamber, means for circulating a cooling fluid through said nozzle cooling chamber, reciprocating valve means within said inner tube adapted to close said outlet opening, and valve operating means connected to said valve means and to said gaseous supply means normally positioning the valve means to open said outlet and operable automatically to close said outlet opening in response to a predetermined reduction in pressure of said supply means below said operating gas pressure.

2. The device as set forth in claim 1, the said valve operating means being adjustable to respond to a desired operating pressure.

3. The device defined in claim 1, wherein the valve means comprises an internal plug insertable into the outlet opening to close the latter, guide means connected thereto for automatic opening and closing movements in relation to said outlet aperture, a valve stem connected to said plug, a fluid-operated reciprocating motor connected to the valve stem to impart said movements to said plug, said motor being connected to said gas supply means in the proximity of its connection to said chamber and operated in accordance with the variation in operating gas pressures.

4. In a furnace for production of molten glass which includes a compartment containing a body of molten glass, the combination of a plurality of devices for injecting gaseous materials into the body of molten glass in said compartment, each of said devices mounted on said compartment and connected into said compartment below the surface level of said glass body and each including an annular tube, means sealing the opposite ends of said tube and an outlet opening in the inner end of the tube that is in communication with said glass body, supply means connected to the tube of each said device for supplying to its outlet opening a combustible mixture of gases under pressure, valve means forming a part of each said device normally maintaining its outlet open and in communication with said supply means, said means comprising a valve member axially moveable in said tube and adapted to close said outlet opening upon engagement therewith, a valve stem connected to said member, a fluid operated motor, means connecting the motor to the valve stem for operating the valve, and means connecting the supply means to the motor, the latter being operable automatically in response to a reduction in said gas pressure to close said outlet opening and disconnect said outlet and said supply means, whereupon said devices are automatically closed against entry of molten glass by a reduction of said gas pressure.

References Cited in the file of this patent

UNITED STATES PATENTS

| | | |
|---|---|---|
| 864,589 | Zimmerman | Aug. 27, 1907 |
| 2,002,513 | Stockmeyer et al. | May 28, 1935 |
| 2,097,378 | McIntyre et al. | Oct. 26, 1937 |
| 2,718,096 | Henry et al. | Sept. 20, 1955 |
| 2,838,105 | Eastman et al. | June 10, 1958 |
| 2,884,744 | Monks et al. | May 5, 1959 |
| 2,909,005 | Beck et al. | Oct. 20, 1959 |
| 2,928,460 | Eastman et al. | Mar. 15, 1960 |

FOREIGN PATENTS

| | | |
|---|---|---|
| 303,993 | Germany | May 8, 1922 |
| 547,826 | France | Dec. 26, 1922 |
| 729,098 | Germany | Nov. 12, 1942 |